(12) United States Patent
McCord et al.

(10) Patent No.: US 12,155,700 B1
(45) Date of Patent: Nov. 26, 2024

(54) SYSTEMS AND METHOD FOR OPTIMIZING PERSONAL COMMUNICATIONS THROUGH OBJECTIVE ALIGNMENT

(71) Applicant: Intelligent Communication Assistant, Inc., Boca Raton, FL (US)

(72) Inventors: Alan W McCord, Forney, TX (US); Gustavo Manuel Damil Marin, Point Roberts, WA (US); Raymond J. Sheppard, Spring Hill, FL (US)

(73) Assignee: Intelligent Communication Assistant, Inc., Boca Raton, FL (US)

( * ) Notice: Subject to any disclaimer, the term of this patent is extended or adjusted under 35 U.S.C. 154(b) by 0 days.

(21) Appl. No.: 18/751,905

(22) Filed: Jun. 24, 2024

Related U.S. Application Data

(60) Provisional application No. 63/601,645, filed on Nov. 21, 2023.

(51) Int. Cl.
*H04L 65/1076* (2022.01)
*H04L 51/02* (2022.01)
*H04L 65/1096* (2022.01)

(52) U.S. Cl.
CPC .......... *H04L 65/1076* (2013.01); *H04L 51/02* (2013.01); *H04L 65/1096* (2013.01)

(58) Field of Classification Search
None
See application file for complete search history.

(56) References Cited

U.S. PATENT DOCUMENTS

| | | | | |
|---|---|---|---|---|
| 9,792,397 | B1* | 10/2017 | Nagaraja | G06F 30/32 |
| 2016/0038092 | A1* | 2/2016 | Golay | A61C 8/00 |
| | | | | 600/408 |
| 2018/0012159 | A1* | 1/2018 | Kozloski | G06N 20/00 |
| 2021/0248703 | A1* | 8/2021 | Esplin | G06F 40/284 |
| 2022/0113049 | A1* | 4/2022 | Maitra | G06N 7/01 |
| 2022/0377844 | A1* | 11/2022 | Kumar | H04W 88/08 |

\* cited by examiner

*Primary Examiner* — Raqiul A Choudhury
(74) *Attorney, Agent, or Firm* — Marin Patents LLC; Gustavo Marin

(57) ABSTRACT

A system to manage incoming communication is described. The system includes a multimedia gateway configured to handle real-time multimedia communications and a communication management server with a master AI agent that receives a notification of an incoming communication associated with a user device from a plurality of user devices. The master AI agent creates a current state for the user environment based on a context associated with the incoming communication, user preferences, and an interaction graph. An action selection function (ASF) is invoked to process the incoming communication, wherein the ASF is associated with an environment state model that implements a Markov Decision Process (MDP) to reflect different states, actions, and associated rewards, wherein the action selection function is configured to determine an action for the incoming communication. The action is executed by the multimedia gateway or an AI communication agent.

18 Claims, 11 Drawing Sheets

SYSTEMS AND METHOD FOR OPTIMIZING PERSONAL COMMUNICATIONS THROUGH OBJECTIVE ALIGNMENT

CROSS-REFERENCE TO RELATED APPLICATIONS

This application claims the benefit of, and priority to, U.S. Provisional Application No. 63/601,645, titled "SYSTEM AND METHOD FOR OPTIMIZING PERSONAL COMMUNICATIONS THROUGH OBJECTIVE ALIGNMENT" filed on Nov. 21, 2023, the specification of which is hereby incorporated by reference in its entirety.

BACKGROUND OF THE INVENTION

Field of the Art

The disclosure relates to the field of communications, and more particularly to the field of managing incoming communication events.

Discussion of the State of the Art

With the increasing use of modern technology and connected environments, users now receive communications via multiple modes including telephone, email, messenger applications, and internet telephony-based applications. Further, at any given instant a user may be performing other tasks on their device or may experience a change of environment where paying attention to non-urgent communications becomes inappropriate. Currently, unwanted communications such as spam emails, robocalls, and untimely messages are a nuisance that disrupts productivity and family time. Spam filters are provided by telecom carriers and/or third-party anti-spam application vendors to help reduce unwanted communication using narrow definitions of unwanted communication based on originating IDs (e.g. phone numbers, email addresses) and message content and do not consider the context of timing, frequency, relationships, and other flexible and dynamic user preferences. With increasing modes of communication, current communication management systems fail to manage received communications in the context of dynamic user preferences and the user's communication network. For example, current communication management systems may consider any unknown communication as spam even if the communication may be related to a known contact of the user. Further, current communication management systems are not aware of different communication modes associated with the user and the user's current state of communications. For example, a user may be interrupted by an incoming phone call during an important video conference. In some cases, users may be interested in receiving calls related to specific products or services. However, as these communications are generally classified as spam, the user may not receive appropriate communication. In addition, current communication management systems typically only deal with direct, explicit contacts or relationships rather than indirect or "latent" relationships. Furthermore, actions taken by current communication management systems are often just one-step actions like direct blocking rather than a planned sequence of multiple actions which accumulate benefits to the user over time.

More recently there has been rapid growth of "generative AI" applications based on Large Language Models (LLM) using methods such as retrieval augmented generation (RAG) to provide "chat-bot" services such as customer support around products and services for businesses. However, these systems are not designed for use by individual users for inbound personal communications. They are unable to manage multiple real-time communication channels, they do not consider the uncertainty of whether an action taken will achieve a goal, have limited ability to reason at scale, or plan a sequence of actions in the presence of uncertainty, and lack the security features to be able to be configured with knowledge of user's personal relationships, the user's current environment and goals and preferences of how the user would like their communications and attention managed. In addition, many AI systems require access to large amounts of historical data, configuration data and examples to be trained before they can begin making accurate decisions. Hence, there is a need for an intelligent communication management system that takes a more nuanced human-centric and holistic view to minimize communication disruptions and optimally manage a user's attention and make decisions that align with the user's objectives, and can be trusted by the user, take into account uncertainty of the results of an action and automatically adapts its methods based on the amount of data available due to privacy or lack of relevant historical data for any new situation the user encounters.

SUMMARY OF THE INVENTION

In some aspects, the techniques described herein relate to a system for managing incoming communications, the system including: a multimedia gateway configured to manage real-time media; a communication management server including one or more processors, a memory, and a plurality of programming instructions stored in the memory, the plurality of programming instructions when executed by the one or more processors causes the one or more processors to: receive, by a master AI agent running on the communication management server, a notification of an incoming communication associated with a user device among a plurality of user devices, wherein the incoming communication is one of a voice message, an audio call, a text message, an email or a video communication; determine, a current state for a user environment based on a context associated with the incoming communication, user preferences associated with the user device and an interaction graph; compare the current state of the user environment with different states in an environment state model, wherein the environment state model implements a Markov Decision Process (MDP) to reflect different states, actions, and associated rewards; responsive to non-identification of a match between the current state and the different states in the environment state model, update an environment state model to reflect the current state; solve the MDP to determine a new action selection function (ASF); invoke, the new ASF to determine an action associated with the user environment for processing the incoming communication, wherein the action is executed by the master AI agent using at least one of the multimedia gateway and/or an AI communication agent among a plurality AI communication agents associated with the communication management server.

In some aspects, the techniques described herein relate to a system, wherein the plurality of programming instructions when executed by the one or more processors causes the one or more processors to: responsive to identifying a match between the current state and an existing state in the different states, invoke an existing ASF to determine an action associated with the user environment for processing the incoming communication.

In some aspects, the techniques described herein relate to a system, wherein the plurality of programming instructions when executed by the one or more processor causes the one or more processors to: store the action executed by the master AI agent at a repository for enabling centralized learning, wherein the master AI agent can access content from the repository.

In some aspects, the techniques described herein relate to a system, wherein the plurality of programming instructions when executed by the one or more processors causes the one or more processors to: responsive to identifying that the incoming communication is call from a spammer, select AI communication agent among the plurality of AI communication agents to communicate with the spammer; responsive to completion of the incoming communication with the spammer, instruct the multimedia gateway to block the incoming communication received from device associated with the incoming communication; and store the device associated with the incoming communication in blacklist data.

In some aspects, the techniques described herein relate to a system, wherein the context associated with the incoming communication includes timing of the incoming communication, historical frequency of the incoming communication, relationship between the user device and the plurality of user devices and the user preferences associated with respective user devices.

In some aspects, the techniques described herein relate to a system, wherein to execute the action, the plurality of programming instructions when executed by the one or more processors causes the one or more processors to: transmit instructions to the multimedia gateway to redirect an incoming call to another resource or another time.

In some aspects, the techniques described herein relate to a system, wherein to execute the action, the plurality of programming instructions when executed by the one or more processors cause the one or more processors to: select AI communication agent among a plurality of agents to initiate a dialog through the multimedia gateway with a device associated with the incoming communication to gather additional data and/or reply to the incoming communication.

In some aspects, the techniques described herein relate to a system, wherein the communication management server maintains the user preferences of registered user devices, wherein the user preferences include at least one of: global objective and goals, do not disturb (DND) hours, contact exceptions, communication type priority, integrated permissions information, and customized rules to identify senders based on keywords.

In some aspects, the techniques described herein relate to a system, wherein the plurality of programming instructions when executed by the one or more processors causes the one or more processors to: responsive to execution of the action, generate a reward, wherein the reward is indicative of fulfillment of the user preferences.

In some aspects, the techniques described herein relate to a method for managing incoming communications, the method including: receiving, by a master AI agent running on a communication management server, a notification of an incoming communication associated with a user device among a plurality of user devices, wherein the incoming communication is one of a voice message, an audio call, a text message, an email, or a video communication, wherein the master AI agent receives communication via a multimedia gateway; determine, a current state for a user environment based on a context associated with the incoming communication, user preferences associated with the user device, and an interaction graph; comparing the current state of the user environment with the different states in an environment state model, wherein the environment state model implements a Markov Decision Process (MDP) to reflect different states, actions, and associated rewards; responsive to non-identification of a match between the current state and the different states in the environment state model, update an environment state model to reflect the current state; solving the MDP to determine a new action selection function (ASF); invoking, the new ASF to determine an action associated with the user environment for processing the incoming communication, wherein the action is executed by the master AI agent using at least one of the multimedia gateway and/or an AI communication agent among a plurality AI communication agents associated with the communication management server.

In some aspects, the techniques described herein relate to a method, wherein the method includes: responsive to identifying match between the current state and an existing state in the different states, invoke an existing ASF to determine action associated with the user environment for processing the incoming communication.

In some aspects, the techniques described herein relate to a method, wherein the method includes storing the action executed by the master AI agent at a repository for enabling centralized learning, wherein the master AI agent can access content from the repository.

In some aspects, the techniques described herein relate to a method, wherein the method includes: responsive to identifying that the incoming communication is a call from a spammer, selecting an AI communication agent among the plurality of AI communication agents to communicate with the spammer, responsive to completion of processing of the incoming communication with the spammer, instructing the multimedia gateway to block the incoming communication received from device associated with the incoming communication; and store the device associated with the incoming communication in blacklist data.

In some aspects, the techniques described herein relate to a method, wherein the context associated with the incoming communication includes timing of the incoming communication, historical frequency of the incoming communication, relationship between the user device and the plurality of user devices, and the user preferences associated with respective user devices.

In some aspects, the techniques described herein relate to a method, wherein executing the action further includes: transmitting instructions to the multimedia gateway to redirect an incoming call to another resource or another time.

In some aspects, the techniques described herein relate to a method, wherein executing the action further includes selecting an AI communication agent among a plurality of agents to initiate a dialog through the multimedia gateway with a device associated with the incoming communication to gather additional data and/or to the incoming communication.

In some aspects, the techniques described herein relate to a method, wherein the communication management server maintains the user preferences of registered user devices, wherein the user preferences include at least one of: global objective and goals, do not disturb (DND) hours, contact exceptions, communication type priority, integrated permissions information, and customized rules to identify senders based on keywords.

In some aspects, the techniques described herein relate to a method, wherein the method further includes: responsive to execution of the action, generating a reward, wherein the reward is indicative of fulfillment of the user preferences.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

DETAILED DESCRIPTION

Figure 1:
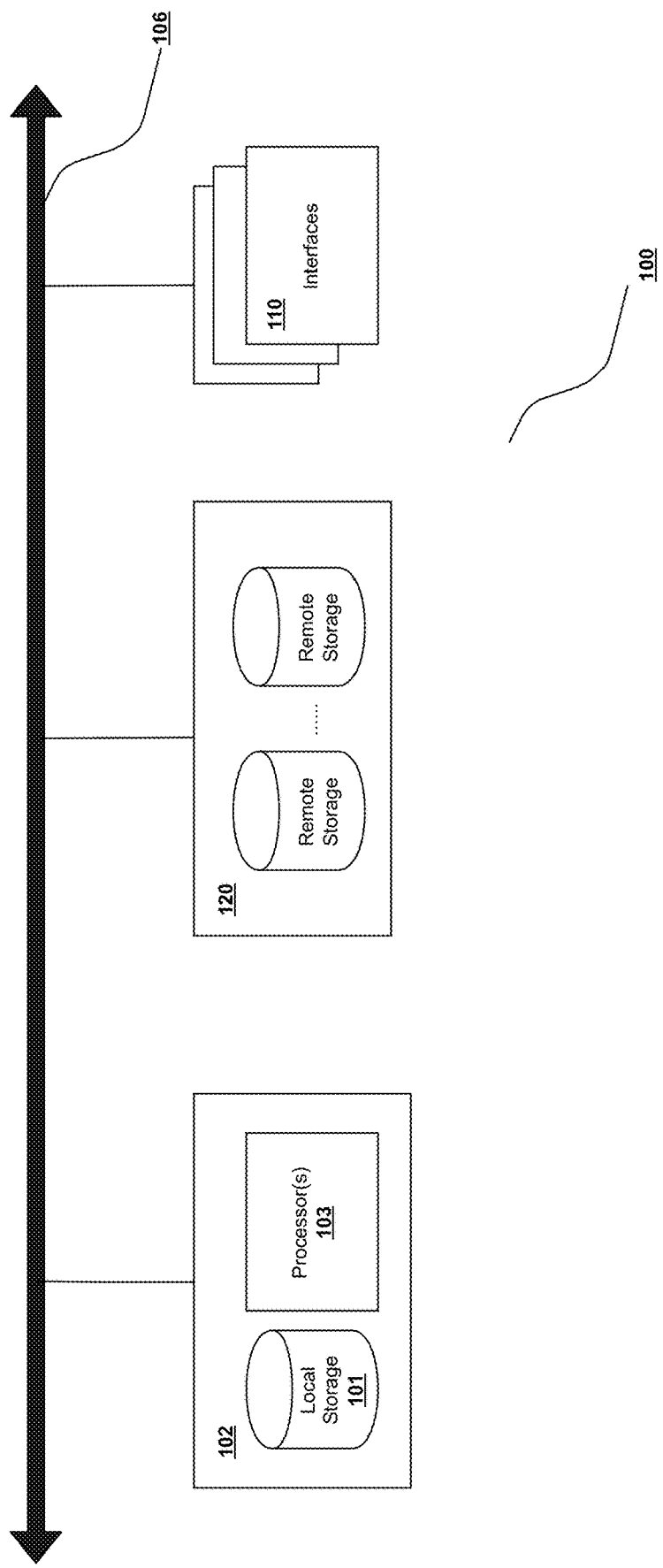
FIG. 1 is a block diagram illustrating an exemplary hardware architecture of a computing device used in an embodiment of the invention.

Accordingly, the inventor has conceived and reduced to practice, in a preferred embodiment of the invention, a system for managing incoming communications. The system comprises a communication management server receiving incoming communication via a multimedia gateway configured to handle real-time media. The communication management server includes a master artificial intelligence (AI) agent to determine an action for processing the incoming communication. The master AI agent computes the current state of the environment after the registered user device receives incoming communication based on the context of the incoming communication, user preferences, and interaction graph. The master AI agent invokes an action selection function (ASF) (policy function) of a reinforcement learning AI model that defines states and actions based on learning and user preferences. The action selected by ASF may be executed by the multimedia gateway and/or one or more AI communication agents.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical, and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to fully illustrate one or more aspects of the inventions. Similarly, although process steps, method steps, algorithms or the like may be described in sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of the described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of more than one device or article.

The functionality or features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code that include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface (s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control the execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
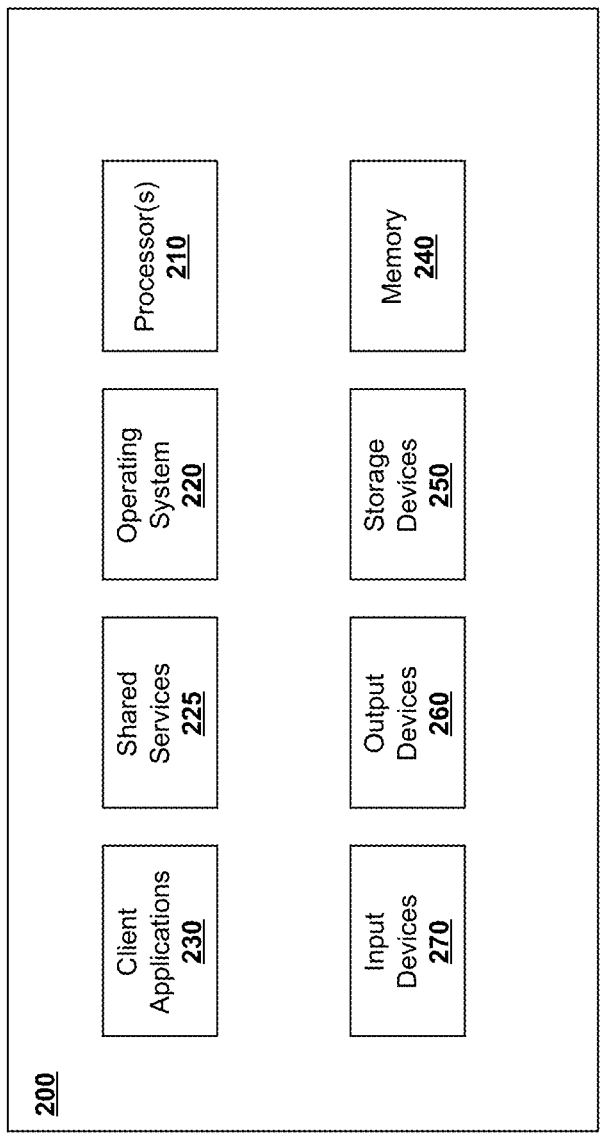
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example, to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
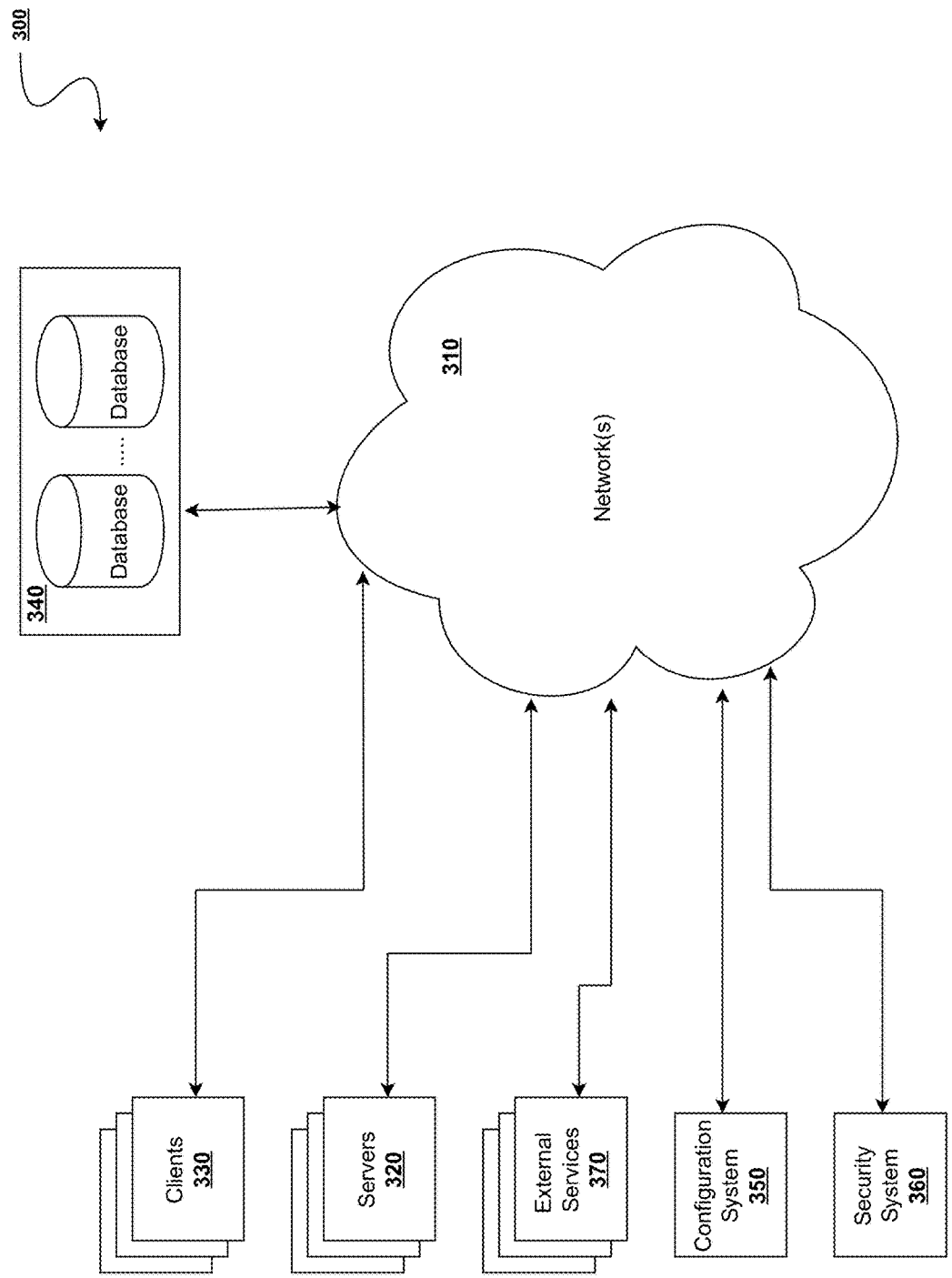
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular incoming communication. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments, one or more databases 340 may comprise a relational database system using a structured query language (SQL), while others may comprise an alternative data storage technology such as those referred to in the art as "NoSQL" (for example, Hadoop Cassandra, Google Big Table, Mongo, and so forth). In some embodiments, variant database architectures such as column-oriented databases, in-memory databases, clustered databases, distributed databases, or even flat file data repositories may be used according to the invention. In addition, Graph-oriented databases, also known as graph databases, are designed to manage and store data structured as graphs, where entities (nodes) are interconnected with relationships (edges), examples include (Amazon Neptune, Microsoft Azure Cosmos DB, JanusGraph, TigerGraph, GraphDB and so forth). These databases are particularly effective for applications involving complex relational queries and traversals, such as social networks, recommendation systems, and network topology analysis.

In addition, vector databases also referred to as vector search databases or similarity search databases, are engineered to index, manage, and retrieve high-dimensional vectors typically generated by machine learning models. These databases are adept at handling operations such as nearest neighbor search in vector space, which is critical for tasks involving image recognition, natural language processing, and recommendation engines, where items are represented as vectors in a multi-dimensional space. Notable examples include Pinecone, Milvus, Weaviate, and Elasticsearch with vector plugins. Vector databases excel in scenarios that require matching patterns or finding similar items based on vector proximity, making them indispensable for modern AI-driven applications such as semantic search, personalization features, and fraud detection systems.

It will be appreciated by one having ordinary skill in the art that any combination of known or future database technologies may be used as appropriate unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database," it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each is generally associated with any IT or web systems. It should be understood by one having ordinary skill in the art that any configuration or security subsystems known in the art now or in the future may be used in conjunction with embodiments of the invention without limitation unless a specific security 360 or configuration system 350 or approach is specifically required by the description of any specific embodiment.

Figure 4:
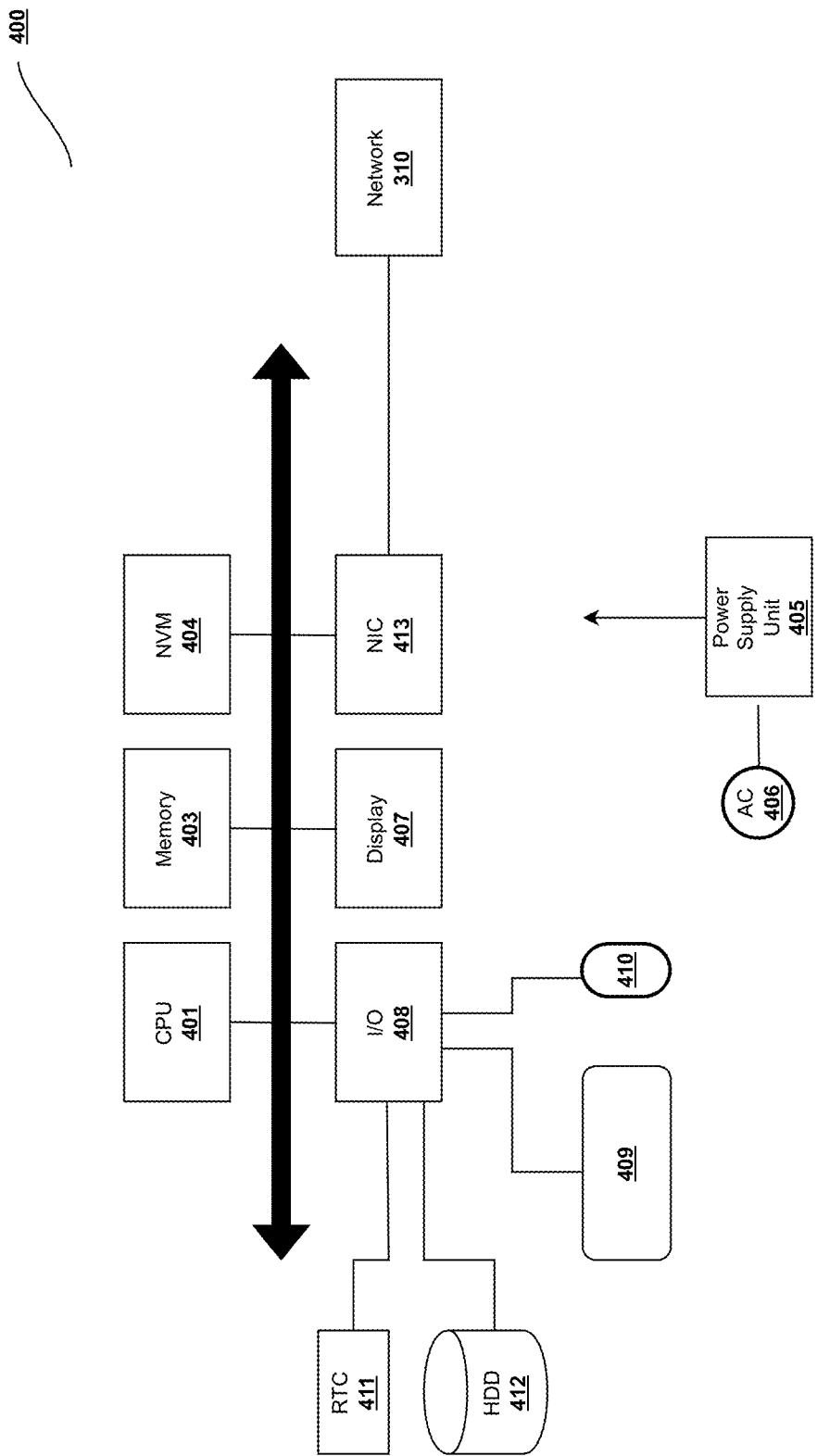
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but do not apply to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Detailed Conceptual Architecture

Figure 5:
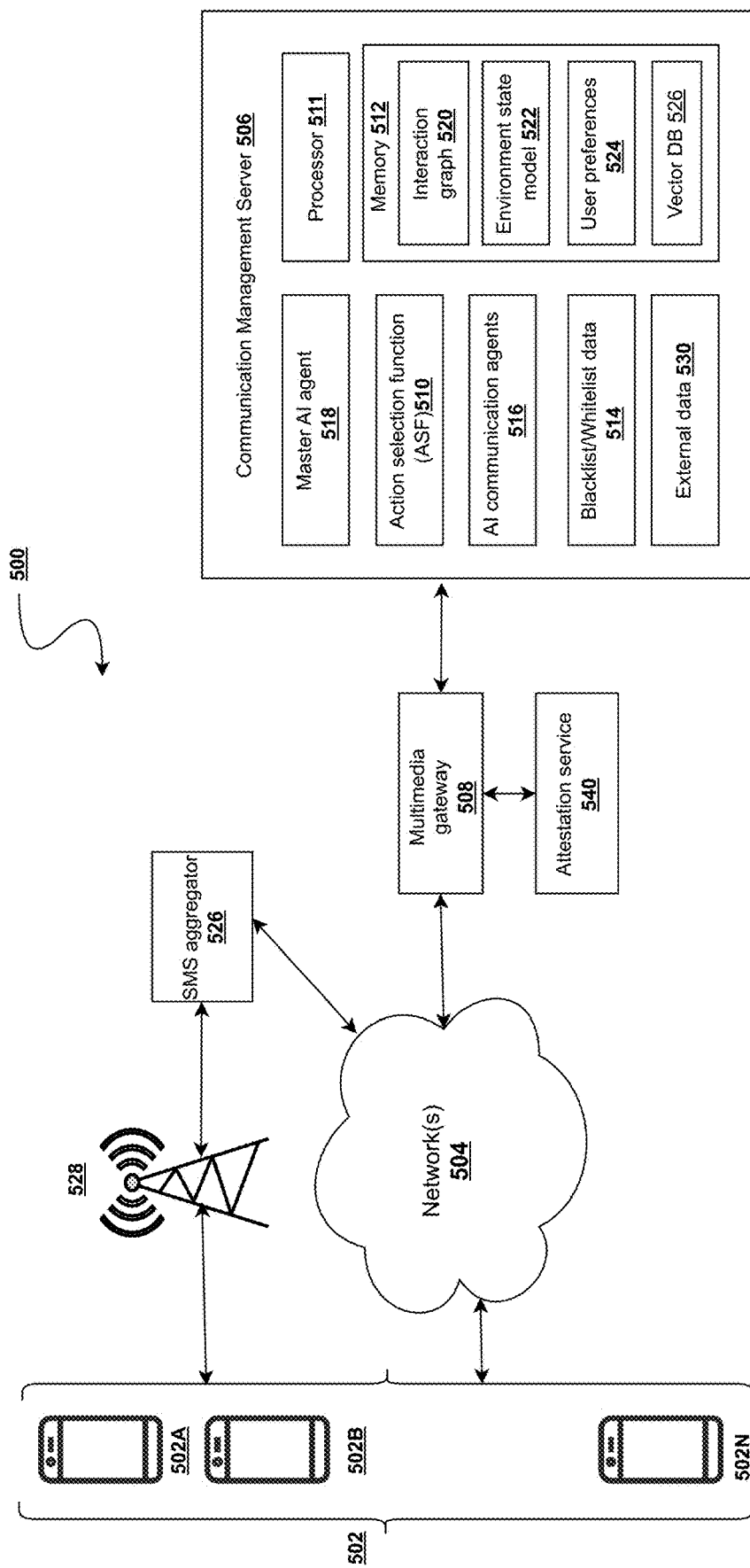
FIG. 5 is an example of communications system architecture in which a communication management server is implemented for managing incoming communications, according to an embodiment of the invention.

FIG. 5 is an example of a communication system architecture 500 in which a communication management server 506 may be implemented for managing incoming communications, according to an embodiment of the invention. In an embodiment, communication management server 506 is in communication with the multimedia gateway 508, which in turn may be connected through one or more networks 504 with a plurality of user devices 502A, 502B . . . 502N, (collectively referred to as user devices 502).

In an embodiment, user devices 502 may include one or more mobile devices, smartphones, general-purpose computers, tablet computers, laptop computers, smart wearable devices, voice command devices, Internet-of-Things (IoT) devices, or any other device capable of communicating with the network 504, including mobile service provider 528, and ultimately communicating through the multimedia gateway 508 with one or more components of the communication management server 506. One subset of the user devices 502 are the devices owned and used by the registered users which are being monitored for incoming communications by the multimedia gateway 508. Another subset of the user devices may be owned and used by known contacts of the registered users. The remainder may be user devices of users unknown to the registered user of the system.

In an embodiment, a device owner first registers an account with the communication management server 506 for their devices, thereby becoming a registered user, and sets initial preferences, regarding contacts and hours and the user's goals if the user wishes. In an embodiment, registered user devices 502 may connect using a progressive web application that uses WebRTC for communications data exchange and registration. Further, the user may answer a series of questions that set their initial objective reward function based on a holistic view of their lifestyle and short-term and long-term goals. After the registered user is set up, incoming communications to the registered user's devices are handled by communication management server 506.

In an embodiment, communication management server 506 may include a processor 511 and a plurality of programming instructions stored in a memory 512. The instruction when executed may be configured to manage incoming communications for registered user devices. Communication management server 506 may be configured to communicate with user devices 502 via the multimedia gateway 508, which may serve as an intermediary between one or more networks 504 and communication management server 506.

In an embodiment, multimedia gateway 508 receives an incoming communication notification from the communication networks 504 including signaling and routing information as well as originating and terminating user identification information from among the plurality of user devices 502. Multimedia gateway 508 responds with appropriate information to pause the communications process while it is processed by communication management server 506. Multimedia gateway 508 may be configured to communicate signaling and routing information along with originating and destination user identification information from among a plurality of users 502 associated with an individual incoming communication from an originating network 504.

In an embodiment, multimedia gateway 508 may be configured to make use of existing third-party attestation data from a third-party attestation service 540 if available. This brings additional contextual data relating to a telco customer and the source of the incoming call. This additional data may be added to the interaction graph 520 to further improve the decisions made by the master AI agent 518 when handling the incoming call.

In an embodiment, memory 512 may be configured to store an interaction graph 520, an environment state model 522 for the registered user for model-based mode, and user preferences 524. In an embodiment, user preferences 524 may be maintained by communication management server 506 and may include: Do not disturb (DND) hours (set unavailable times to mute notifications), contact exceptions (override hours for priority contacts), channel priorities—rank messaging, email, calls for importance, custom rules (If-then logic to route senders and keywords), AI delegation (desired level of automation versus user confirmation), activity settings (visibility of transcripts, recording, data), integration permissions (allowed 3rd parties and data access). In addition, the registered user can enter a statement of their overall short-term and long-term goals relating to communications decisions. Details related to configuring the user preferences and rules are described in FIGS. 7A and 7B.

In an embodiment, the interaction graph 520 may be a heterogeneous multigraph holding multiple graph representations with different types of nodes and different types of edges between nodes for different purposes. At the lowest level, the interaction graph 520 may capture current or historical communications (or communication attempts) between devices where each node represents a unique device, and each edge represents an individual communication between devices. Each node has a rich set of attributes relating to the details of the device and each edge has a rich set of edge attributes associated with the communication between the nodes, including information like the channel type, duration, subjects, content, and embeddings of content. In an embodiment, these detailed historical interaction data are essentially immutable (as they can be considered the raw "facts" in the terminology of data warehousing).

The interaction graph 520 in the communication management system is a complex network of nodes and edges representing users, their relationships, and communication interactions. To effectively leverage this graph-structured data for decision-making, the master AI agent 518 employs Graph Neural Networks (GNNs), a cutting-edge AI technique designed to process and learn from graphs.

GNNs work by iteratively updating the representation (embedding) of each node and edge in the graph based on the features of the node itself, the features of its neighboring nodes, and the features of the connecting edges. This allows the GNN to capture both the local and global structure of the interaction graph and learn meaningful patterns and relationships.

The master AI agent 518 uses a specific type of GNN called a Graph Convolutional Network (GCN) to process the interaction graph. The GCN consists of multiple layers, each of which performs the following operations:

1. Feature Aggregation: For each node, the GCN aggregates the features of its neighboring nodes, and the features of the connecting edges, weighted by the strength of their connections (edges).
2. Edge Feature Transformation: The features of the edges are transformed using a learnable weight matrix to compute new edge representations that capture the characteristics of the relationships between nodes.
3. Node Feature Transformation: The aggregated node features and transformed edge features are then combined and transformed using another learnable weight matrix to compute a new representation for the node.
4. Non-linear Activation: A non-linear activation function, such as ReLU (Rectified Linear Unit), is applied to the transformed features to introduce non-linearity and increase the expressive power of the GCN.

By stacking multiple GCN layers, the master AI agent can learn hierarchical representations of the interaction graph, capturing both low-level features (e.g., individual communication interactions and relationship characteristics) and high-level patterns (e.g., group communication dynamics and complex relationship structures).

The learned representations from the GCN, including both node and edge embedding, are then used as input features for the Environment State Model 522 and a Markov Decision Process (MDP) which is then solved to find the Action Selection Function (ASF) 510 to make more informed and context-aware decisions for managing incoming communications based on the user's preferences and the structure of the interaction graph, and the nature of the relationships between users. Specifically, the learned embeddings from the GCN may be used as input features for the MDP in the following ways:

State Representation: The Environment State Model 522 of the MDP may be represented using the embeddings of the relevant nodes and edges in the interaction graph. For example, when a new communication arrives, the state may be constructed by concatenating the embeddings of the sender node, the recipient node, and the edge representing their relationship. This environment state representation provides the MDP with rich information about the context of the communication, including the characteristics of the involved users and their relationship. Clustering in the embedding space may then be performed to proactively manage the size of the state space.

Reward Function: The reward function of the MDP is designed to align with the user's preferences and the desired communication management objectives. The GCN embeddings may be used to compute rewards based on the characteristics of the users their relationships and the communication content. For example, edge embeddings can assign higher rewards for prioritizing communications from important contacts, or the importance or urgency of the communication based on the nature of the relationship between the sender and the recipient and the embedded content of the communications.

Transition Probabilities: The transition probabilities of the MDP, which define the likelihood of moving from one state to another based on the chosen action, can be based on historical frequency or in their absence, also estimated using the GCN embeddings. The embeddings can capture patterns and dynamics in the interaction graph that influence the outcomes of communication management decisions. For instance, the node and edge embeddings can help predict how users are likely to respond to different actions taken by the master AI agent, such as the probability of a delegated task being completed successfully based on the characteristics of the assigned person or agent.

At the higher level, the interaction graph may capture relationships between the parties (who operate the devices) where each node represents a unique party, and where each edge between parties represents a relationship between parties. This enables the interaction graph to represent affinities, common interests, and other associations between parties as general relationships. These relationships may be dynamic, unlike the immutable device-level graph edges. Each node may have a rich set of known attributes about the party, e.g. for human parties this this can include demographics, personal preferences, and interests. But there can be multiple kinds of relationships between two parties. One kind of relationship can be e.g. a declared actual familial or business relationship between parties, e.g. "is the spouse of" "is a child of" or "is business partner of" Another relationship could be an "affiliation" between two parties in terms of a formal or informal connection or association that would typically involve some form of cooperative relationship or alignment or common interest, e.g. "share interest in mountain biking" or "share interest in antique collection." A communication interaction relationship exists when there is frequent communication between parties even though the topic of conversation may not be known. The interaction graph therefore uses an aggregated measure of frequency or strength of communications between two parties to represent a communications interaction relationship.

The interaction graph 520 discovers and stores the association of one or more devices to each party over time or also the fact that multiple parties may share the use of certain devices in some circumstances (such as a shared home or office communications device). In an embodiment, the parties included in the interaction graph nodes also include AI machines acting like proxies for humans which may include the AI communication agents 516 of the system itself, but also any third-party communication bots.

Interaction graph 520 therefore captures relationships and associations between devices and parties that may be useful in optimizing communication interactions and unlocking value through actions creating new interactions (or blocking interactions) between nodes. Data from interaction graph 520 may be used for additional feature calculations such as correlation, causation, covariance, association rules, dependencies, time-series relationships, spatial and temporal associations, and general multivariate relationships. A simple example of an interaction graph 520 is described in FIG. 6.

In an embodiment, master AI agent 518 receives signaling and routing information about incoming communication directed toward a first-user device via multimedia gateway 508. Based on the content and context of the incoming communication, the master AI agent 518 first updates the interaction graph 520 and then uses the interaction graph 520 data to update environment state model 522 in case a similar state is not previously captured.

In an embodiment, environment state model 522 is a state machine that tracks the current environment state of the registered user which may include the number and type of live communications the registered user is currently paying attention to, including the state of each. Further in some cases, in addition to considering the communication state of the registered user other attributes of the physical environment, the user is in, and even states such as the emotional, and tiredness state of the registered user may be tracked by the environment model.

Environment state model 522 may be used by master AI agent 518 to determine the action to be performed for processing the incoming communication. Environment state model 522 may be the basis of a reinforcement learning-based AI model that defines states and associated actions based on learning and user preferences 524. In an embodiment, environment state model 522 is designed to allow communication management server 506 to identify and trigger the modification of the communication state of user devices and to take other actions. In an embodiment, environment state model 522 may be used by the master AI agent 518 to implement a fully observable Markov Decision Process (MDP). Details of an environment state model 522 are described in conjunction with FIG. 8.

In some aspects, the techniques described herein relate to a model-based method for managing incoming communications, whereby the environment state model 522 is selected to be partially observable and may be modelled by a Partially Observable Markov Decision Process (POMDP). The POMDP allows the invention to plan communication actions under uncertainty that considers not just the probabilistic outcomes of actions (like for MDPs) but also the uncertainty of what the current state is due to privacy or other data restrictions.

In an embodiment, master AI agent 518 may be configured to initiate actions for incoming communication. The actions taken on behalf of the user may be in alignment with the user's short-term and long-term goals. In one embodiment, the master AI agent 518 may perform decision-making using two different approaches to reinforcement learning referred to as "model-based" and "model-free." The master AI agent 518 may switch between these two approaches based on the availability of adequate relevant historical data, the observed decision quality, user goal modifications, or changes in the user's environment. The terms "model-based" and "model-free" are used here in the context understood by those skilled in the art of reinforcement learning. Model-free approach to decision-making and switching between model-based and model-free approaches is described in FIG. 10. FIGS. 6-9 describe the use of a model-based approach for determining actions for processing incoming communication.

During operation, based on the information available in the system, a current state of the environment is generated and master AI agent 518 may invoke the action selection function (ASF) 510 to determine the action to take to process the incoming communication. The action selected by ASF 510 may be executed by the master AI agent 518 using the multimedia gateway 508 and/or AI communication agent. For example, the action may be to send an instruction directly to the multimedia gateway 508 to block the incoming call, or the master AI agent 518 invoke one or more generative AI communication agents 516 to perform additional sub-tasks according to different agentic roles before sending an instruction to the multimedia gateway 508.

For some incoming communications, the action chosen by the ASF 510 and executed by the master AI agent 518 may be a complex one requiring the master AI agent 518 to invoke an AI communication agent 516.

In an embodiment, AI communication agents 516 are generative AI models that use natural language processing to extract preferences from conversations, emails, and messaging history to infer optimal communication hours, interests for conversation topics, and priority contacts. In an embodiment, AI communication agents 516 operate in the framework of retrieval augmented generation, declarative model building, and collective reasoning under the control of the master AI agent 518.

The AI agents in the communication management system are more than simple generative AI agents and may utilize Machine Learning (ML) techniques to continuously improve their decision-making capabilities. This involves:

Data Collection: Gathering historical data on incoming communications, user preferences, actions taken, and outcomes.

Feature Extraction: Identifying key features from the collected data that are relevant for decision-making, such as sender attributes, communication type, content keywords, and user feedback.

Model Training: Using the extracted features to train ML models, such as decision trees, support vector machines, deep neural networks, or graph neural networks to predict the best actions for handling incoming communications.

Model Evaluation: Testing the trained models on a separate dataset to assess their performance and make any necessary adjustments.

Online Learning: Continuously updating the ML models based on new data and user feedback to adapt to changing user preferences and communication patterns.

Unsupervised Learning: Applying techniques such as clustering and dimensionality reduction to identify hidden patterns and structures within the data, which can provide insights and improve the decision-making process.

By leveraging ML techniques, AI agents can learn from past experiences and improve their ability to make optimal decisions that align with the user's goals and preferences.

In an embodiment, different AI communication agents 516 may be configured to support different types of communications. For example, a first AI communication agent may be associated with performing voice-based actions, a second AI communication agent may be associated with handling email communication and a third AI communication agent may be associated with incoming text messages.

During the processing of the incoming communication, an AI communication agent 516 may be utilized by master AI agent 518 to generate communication contents for the incoming communication. In some cases, AI communication agents 516 may analyze communication content.

In addition to machine learning and generative AI techniques, AI communication agents may employ more conventional Natural Language Processing (NLP) techniques to analyze and understand the content of incoming communications. This includes:

Tokenization: Breaking down the text into individual words or tokens.

Part-of-Speech (POS) tagging: Identifying the grammatical role of each word (e.g., noun, verb, adjective) to understand the structure of the sentences.

Named Entity Recognition (NER): Identifying and classifying named entities such as people, organizations, locations, and dates.

Sentiment Analysis: Determining the sentiment (positive, negative, or neutral) expressed in the communication to gauge the emotional tone.

Intent Recognition: Identifying the purpose or goal of the communication, such as making a request, asking a question, or expressing a complaint.

By applying these NLP techniques, the AI communication agents can extract meaningful information from the incoming communications, which is then used by the master AI agent to make informed decisions on how to handle each communication based on the user's preferences and the interaction graph.

In an embodiment, communication management server 506 may include a blacklist/whitelist data 514. This may be used to avoid unnecessary repeating of reasoning to determine whether an incoming multimedia communication should be immediately blocked or be connected for further processing. The data may also be prepopulated through the $3^{rd}$ party attestation service or user preferences. The data may be configured with an expiry timeout.

In an embodiment, communication management server 506 may include a vector DB 526 which is a specialized type of database designed to efficiently handle vector embeddings, which are high-dimensional vectors used to represent complex data items in a form suitable for machine learning algorithms, particularly in the context of similarity search operations or compressed representations of graph data. This may be used by the master AI agent 518, in its method of managing the large state-space during model-based operation, but also for more efficient routing and semantic search operations.

During operation, an incoming communication associated with a user device among a plurality of user devices is received on a multimedia gateway wherein the incoming communication is one of a voice message, an audio call, a text message, an email, or a video communication. The multimedia gateway provides new context and content data associated with the incoming communication which is sent to the master AI agent. The master AI agent stores the new information in the interaction graph memory. It then invokes the reinforcement learning action selection function ASF to determine an action for processing the incoming communication, wherein (for the model-based mode) the action is associated with the modified environment state, and information from the interaction graph, wherein the interaction graph is indicative of previous interactions and relationships of the user and user device, other user devices, and also with AI communication agents invoked previously by the communication management server.

The action selected by the action selection function ASF may be executed by a function call from the master AI agent 518 to an internal application programming interface (API).

Some function calls are executed on the multimedia gateway, but a selected action may require the master AI agent to perform additional sub-tasks including the selection and configuration of AI communication agents to co-operate to further analyze content, or for generating new multimedia content, perform additional limited reasoning and estimations and so on. On completion of such sub-tasks or in the event of a timeout, the master AI agent 518 may send a completion message back to the multimedia gateway 508 that specifies any final external actions for multimedia gateway 508 to continue handling user devices.

In an embodiment, multimedia gateway 508 and communication management server 506 may operate in the cloud, and master AI agent 518 may perform functions when one or even all of the registered user's devices are offline or even powered down. This enables a high degree of intelligent communication handling, content analysis, and generation to occur even in the complete absence of the registered user and their devices.

In an embodiment, communication management server 506 may be implemented as a set of microservices for each of the various components of communication management server 506 running in containers. In an embodiment, the multimedia gateway 508 may be software that sits in front of an application programming interface (API) or group of microservices to facilitate requests and delivery of data and services between user devices 502 and the communication management server 506. Its primary role may be to act as a single-entry point and standardized process for interactions between the communication management server 506, and the external networks 504, user devices 502, and other external devices.

In another embodiment, the components of the communication management server 506 and multimedia gateway 508 may be implemented as containerized microservices that run in a cloud computing environment. The use of containerization is important in that service instances can be spun up in near-real-time and then made inactive when no longer required. Certain elements such as the multimedia gateway 508 need to be running continuously but can be shared through multi-tenant configuration. The architecture is provided with telco-grade security with encryption, data isolation, access controls, key management, and auditing. Communications are encrypted in transit and at rest using TLS, HTTPS, and AES standards. AI communication agents 516 processing may be isolated through containerization and private cloud tenants. Granular role-based access control may be used for managing user and agent permissions. Secrets and keys follow principles of least privilege and rotation. Detailed security event logging provides transparency and supports forensic analysis. User authentication may include Password, 2FA, SSO, and biometrics.

Detailed Description of Exemplary Embodiments

Figure 6:
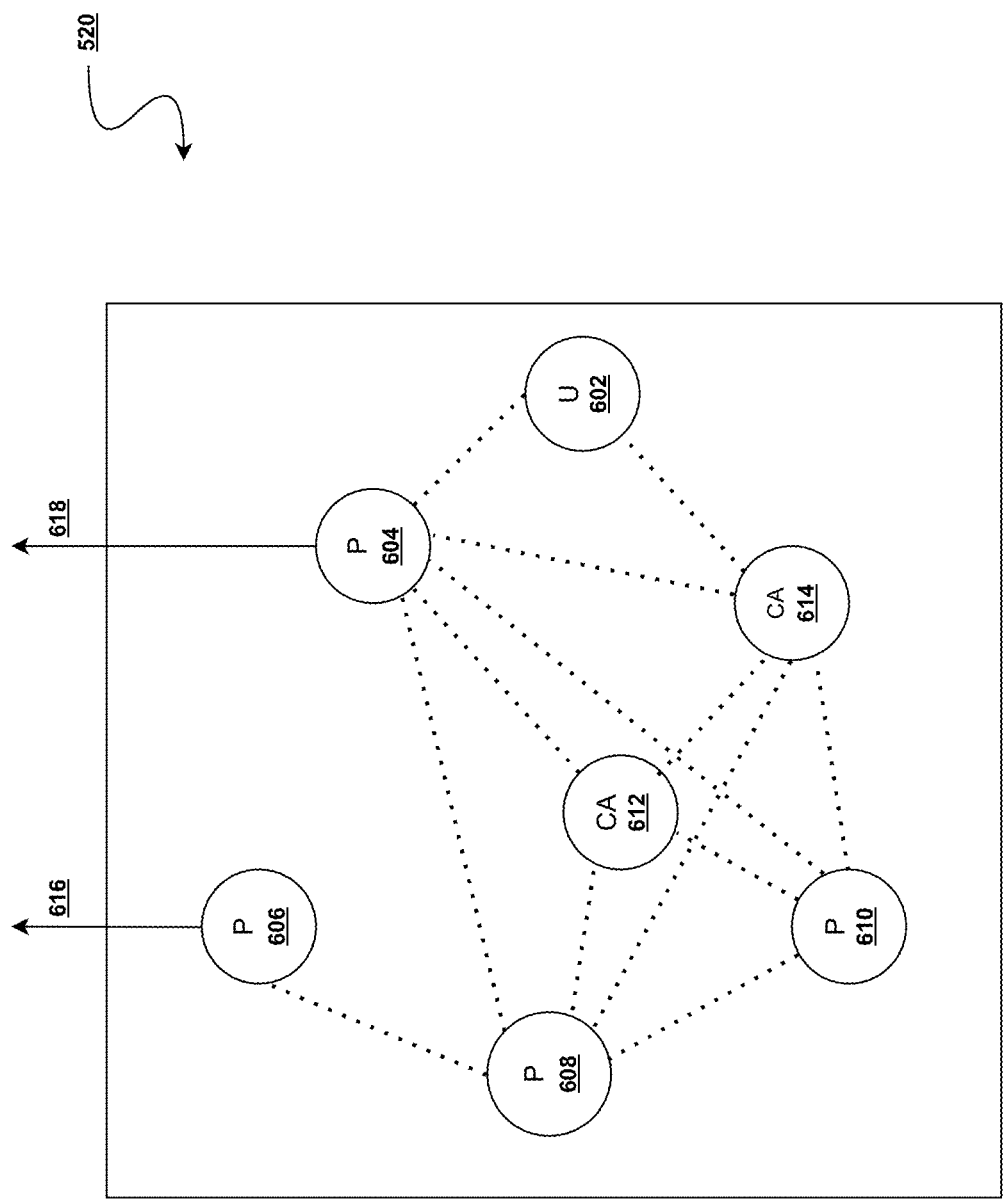
FIG. 6 is an illustration of an interaction graph, according to an embodiment of the invention.

FIG. 6 is an illustration of an interaction graph 520, according to an embodiment of the invention. In this simplified view device nodes are not shown, only party nodes. Each circular node labeled P corresponds to a person, "party" or "contact," and a registered user may be labeled "U", and the AI communication agents are labeled CA. Registered user U-602 may use devices (not shown in this figure) for communication. Interaction graph 520 may be stored in memory 512. Interaction graph 520 represents people and software agents as nodes with relationships and relationships or affinities as edges. The dotted edges in the interaction graph 520 may depict communications interaction relationships between registered user U-602, with known party contacts (P-604, P-606, P-608, P-610), and AI communication agents CA-612 and CA-614. In one embodiment, the edges are weighted by the number of historical interactions between parties and where the absence of an edge indicates no previous direct historical interactions. In FIG. 6, node U-602 represents a registered user as a center point or "root" of their interaction network. Surrounding party nodes (P-604, P-606, P-608, and P-610) represent other people connected to the user. These may include friends, family, coworkers, and acquaintances, but may also represent the source of incoming communications from people or spam bots entirely unknown to the user. AI communication agents CA-612 and CA-614 may be actively connected with users and contacts dynamically by the master AI agent 518 when making decisions about incoming communications by considering relationships, common attributes, and history.

In an embodiment, AI communication agents at nodes CA-612 and CA-614 may be configured by the master AI agent 518 to interact with specific parties. In an embodiment, solid lines 616 and 618 in FIG. 6 may represent actual communication session attempts towards the device of user 602 triggered from parties P-606 and P-604 respectively. In this example, attempt 618 represents a repeat connection between parties P-604 and U-602 which already have a strong direct communications interaction relationship, whereas attempt 616 represents an attempt to make an initial connection from a device of party P-606 to a device of party U-602, which has only a single third level human connection via P-608 and P-604.

Figure 7A:
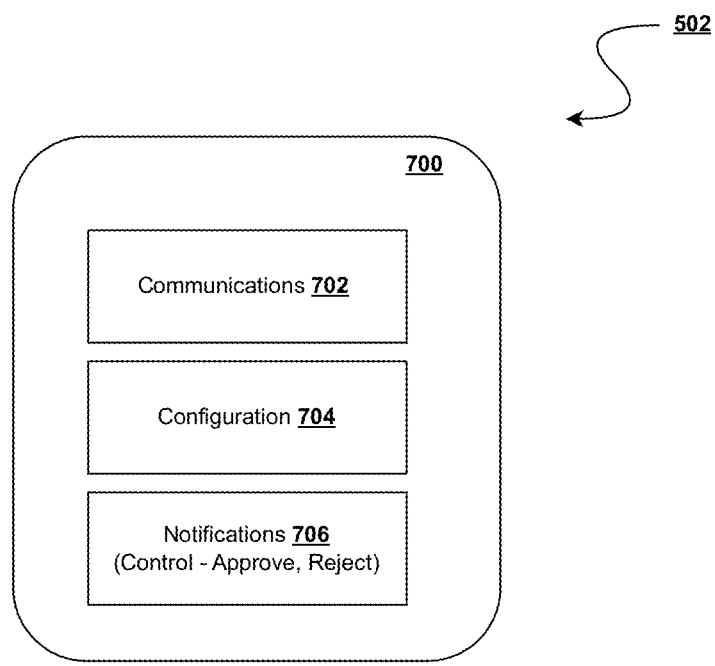
FIGS. 7A and 7B depict the dashboard of a mobile application associated with a communication management server on a user interface, according to an embodiment of the invention.
Figure 7B:
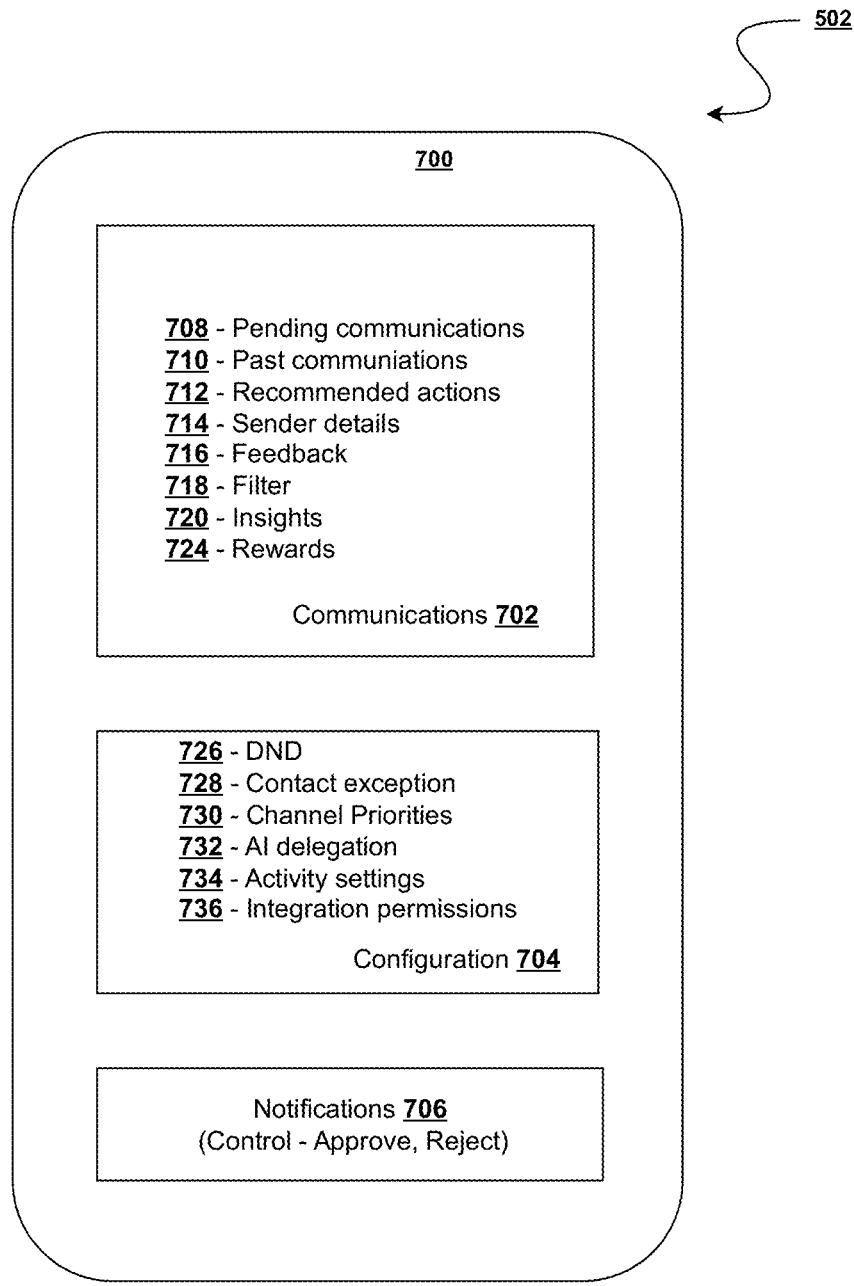

FIGS. 7A and 7B depict example dashboards 700 of a user application associated with user preferences 524 within communication management server 506 on the user interface, according to an embodiment of the invention. In an embodiment, the dashboards shown in FIGS. 7A and 7B are examples of an application displayed on a smartphone of user devices 502.

Dashboard 700 helps users set the preferences for and respond to notifications from the communication management server 506 using communications 702, configurations 704, and notifications 706. Users can manage their incoming communications by using a mobile web application associated with communication management server 506. In an embodiment, notifications 706 may include a control button to approve, reject, or alter suggestions provided by AI communication agents 516.

Communications 702 may provide a list of pending communications 708 and past communications 710 along with master AI agent 518 recommendations and actions 712. In an embodiment, a user may have access to sender profile details 714 including the person's name, company, location, and photo. In an embodiment, the user can provide feedback 716 on the recommendations and actions from master AI agent 518. In an embodiment, the user can use filter 718 to narrow the view of, e.g., pending communications 708 and past communications 710 by date range, specific senders, or communication channel. Filters 718 may be used, e.g., for searching for contacts and identifying communication patterns.

Insights 720 provides summary statistics and trends about communications associated with users based on incoming communication of user devices. For example, volume and trends for different channels and sender types may be provided to the user. In another example, insights 720 may be specific to AI communication agents 516 and actions taken. Frequency of handling, redirecting, gathering info, and blocking. Further, in some embodiments, insights 720 provides metrics related to communication. Metrics may include conversational quality and processing of unwanted versus wanted communications. Conversational quality reflects on natural language metrics like fluency, coherence, and accuracy. Unwanted versus wanted communications include a comparison of communications deemed wanted against unwanted.

In an embodiment, goals, and rewards 724 are provided to enable the user to express the overall goals they want to achieve with communication management and to specify rewards that are indicative of a related alignment score. Alignment score may be a quantitative measure of reward captured vs maximum possible. Configurations 704 provides a list of configuration options for setting user preferences 524 and rules for managing communication. Do not disturb (DND) hours 726 may be set by the user. DND may refer to unavailable times to mute notifications. Contact exception 728 may be related to priority contacts. DND may not apply to contact exception 728. Channel Priorities 730 allows users to rank different channels of communication (messaging, email, calls for importance, custom rules) in order of priority. Further, channel priorities may also include rules and conditions to route senders and keywords. AI delegation 732 refers to the level of automation versus user confirmation. In an embodiment, the master AI agent 518 may direct actions without requiring user confirmation via a control button. Activity settings 734 may be related to the visibility of transcripts, recording, and data storage. Integration permissions 736 display the allowed third parties that can access user device data. This type of configuration and communication-related insights may assist in the data-driven tuning of the master AI agent 518 to help in improving alignment and effectiveness.

Figure 8:
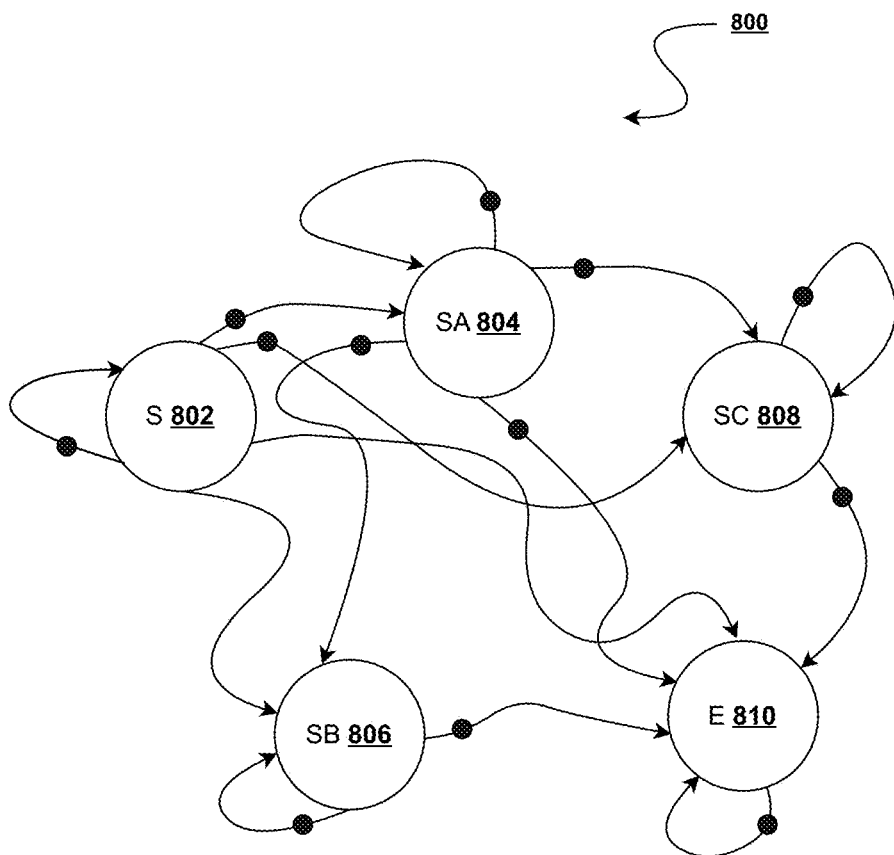
FIG. 8 illustrates an example of an environment state model used by a master AI agent for determining the action, according to an embodiment of the invention

FIG. 8 illustrates an example of a highly simplified environment state model 800 used by master AI agent 518 for determining an action for incoming communication, according to an embodiment of the invention. In an embodiment, master AI agent 518 invokes ASF 510 to determine the action to be selected for processing the incoming communication. ASF 510 may be associated with the environment state model that implements the MDP to reflect the different states, actions, and associated rewards. In the example shown in FIG. 8, environment state model 800 may be implemented as a fully observable MDP. MDP provides a mathematical framework for modeling decision-making in situations where outcomes are partly random and partly under the control of a decision-making agent. MDPs are used to help make decisions that maximize the cumulative reward to the registered user. MDP is a framework for AI model-based reinforcement learning. Environment state model 800 may be configured with states, transitions, and rewards based on the user preferences. The MDP may be characterized by the following:

States (S): A set of states describing the possible combined state of the agent representing the registered user in its environment. In FIG. 8 states labeled SA-804, SB-806, and SC-808 depict different states corresponding to specific communication and general environment states with a registered user. In an embodiment, a user will have many states for representing variation of communication-related states and many more for additional holistic state combinations. The states in environment state model 800 may be designed based on the user preferences and short-term and long-term goals of the registered user or clustering of GCN embeddings.

Actions (A): A set of actions that can be taken by the master AI agent 518 in any specific state. The black dots on each state transition may reflect the different possible actions taken from that state which will result in a probabilistic transition to the next state indicated by the transition arrow.

Transition Probabilities (P): The transition model is a description of what state the registered user moves to in their environment, given the current state and action taken by the master AI agent 518. The transition is uncertain and has a probability associated with it for each combination of state and available action. For example, when a spammer is asked a question to discover more information about them or the purpose of the call, they may answer the question or they may abandon the call resulting in transitions to different communication states with different probabilities. In an embodiment, the registered user may start their first day on the system at state "S-802" and may desire to be close to some holistic state "E-810" at the end of the day with messages answered and no communications active and located in their bedroom by 11 pm. Powering on their phone the next morning would result in them being transitioned to a new starting state depending on waiting messages and any missed calls.

Figure 9:
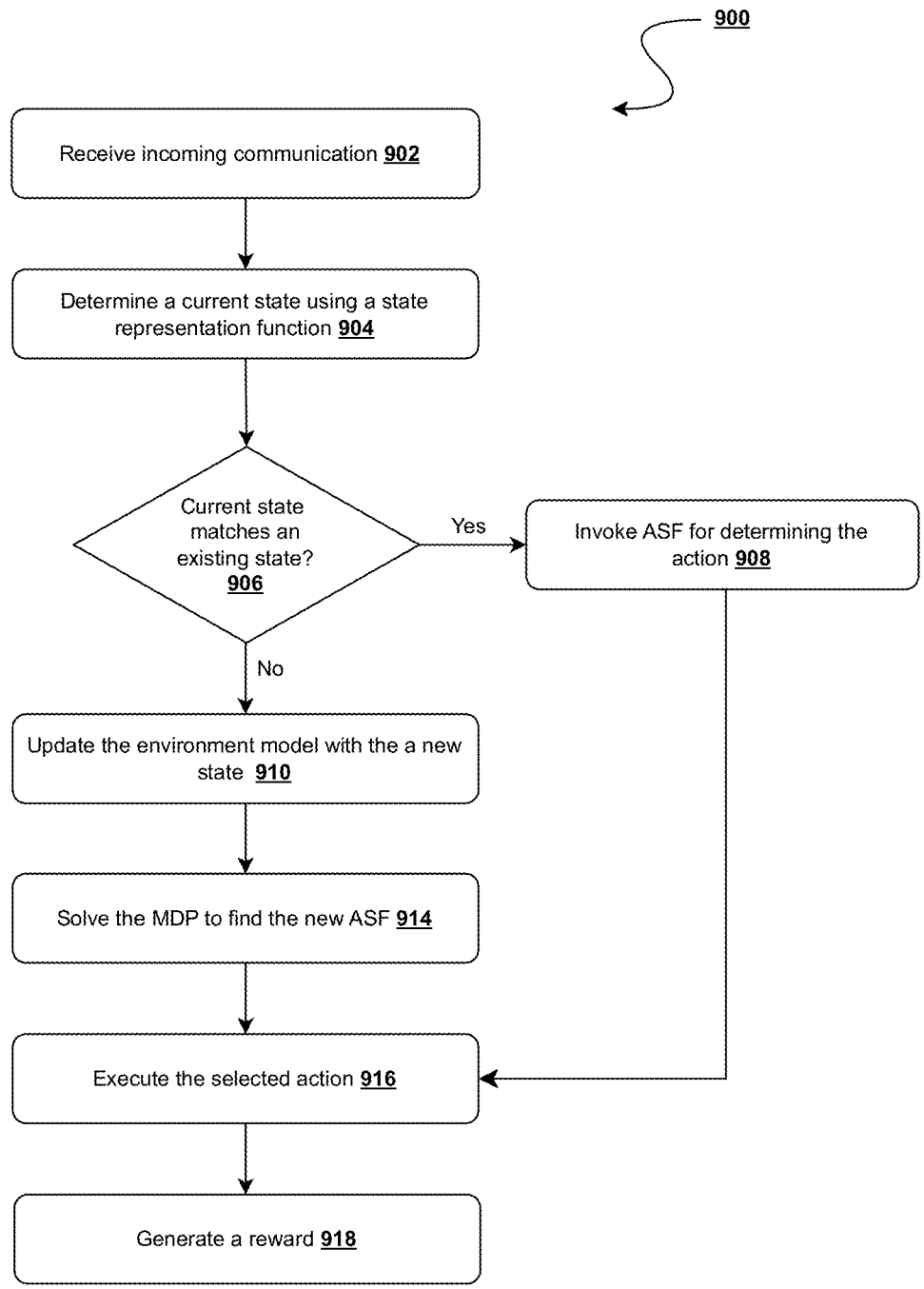
FIG. 9 is a flow diagram of an example method for determining an action for processing an incoming communication using an MDP model-based approach, according to an embodiment of the invention.

Rewards (R): A reward function that returns the immediate reward received after transitioning from one state to another due to an action. Rewards are a measure of fulfillment of user preferences 524 by master AI agent 518. In an embodiment, different actions may be associated with different rewards FIG. 9 is a flow diagram of an example method 900 for determining an action for processing an incoming communication using an MDP model-based approach, according to an embodiment of the invention using the MDP model-based approach. The steps of method 900 may be performed at communication management server 506 by the master AI agent 518.

In the model-based approach, environment state model 522 may be configured to model the state of the user's world and to predict the outcomes (next states and rewards) of communications actions taken from a particular state the user may be in at the time the action is taken. Because they possess a model of the environment, model-based systems may also plan by considering multiple future states and choose actions that optimize long-term rewards. This capability allows for sophisticated strategies that plan a sequence of future events. A model-based system can therefore use the environment model to simulate and evaluate not only the immediate reward from an individual action but also the accumulated reward of sequences of actions to maximize long-term rewards. In model-based reinforcement learning, the objective is to learn a function that provides a mapping from the current state of the user in their environment to the best action they can take, i.e. the one that maximizes the expected value of the total (discounted) reward in the future. An advantage of the model-based approach is that it can efficiently make use of prior knowledge and extrapolate to new situations not previously encountered.

At step 902, master AI agent 518 may receive signaling and routing information related to the incoming communication device via the multimedia gateway 508. The incoming communication may be directed towards a first-user device registered with the communication management server 506. The incoming communication may be a voice message, an audio call, a text message, an email, or a video communication.

At step 904, master AI agent 518 may use a state representation function to determine the current state of the user environment. In an embodiment, a state representation function may update interaction graph 520 based on the incoming communication and may determine the environment state of the user based on a context associated with the incoming communication, user preferences associated with the user device, and the updated interaction graph 520, and features from the GCN.

In an embodiment, an existing State Representation Function may be used to map the structured and unstructured description into a single state s of the set of all states S of the model-based Markov Decision Process.

In an embodiment static, dynamic, structured, and unstructured data may be retrieved from interaction graph 520 and user preferences 524 to create a declarative form of the decision problem to be solved. The decision problem may consider structured and unstructured data to generate a current state in the environment state model 522.

Examples of structured and unstructured data may include Do Not Disturb (DND) hours (set unavailable times to mute notifications), contact exceptions (override hours for priority contacts), channel priorities—rank messaging, email, calls for importance, custom rules (If-then logic to route senders and keywords), AI delegation (desired level of automation versus user confirmation), activity settings (visibility of transcripts, recording, data), integration permissions (allowed 3rd parties and data access), short-term and long-term goals relating to communications decisions that may be found in the user preferences 524 present in memory 512 of communication management server 506. In addition to user preferences 524, data from interaction graph 520 including relationship scores with friends, family, and co-workers may also be considered. Besides using data from interaction graph 520 and user preferences 524, data from users' calendars, and currently active communications in progress along with their content type and duration may also be incorporated. In an embodiment, the actual data may be a mixture of JSON (JavaScript Object Notation) text for the more structured data and plain text for the unstructured data.

At step 906, master AI agent 518 determines if the current state of the user environment matches with an existing state. When the current state defined at step 904 matches an existing state in environment state model 522 then at step 908, the ASF (policy) is called to determine the action to be taken which is returned to the master AI agent 518 at step 916.

At step 906, when the current state determined in step 904 does not match with an existing state, then at step 910, the environment state model 522 is updated with the new state based on the created current state. State representation function may be involved in normalizing numerical values, numerically encoding categorical variables, converting text data into dense vector embeddings, using the embeddings of the GCN, clustering of dense vectors to define states S, and validating states with LLM. Environment state model 522 may be updated for the new state using starter data from history if available or using starter data from a Large Language Model (LLM). The updating of environment state model 522 with new states using clustering of dense vector embeddings ensures that state generation does suffer from drawbacks of high dimensionality. Further, in some embodiments, environment state model 522 may be updated to remove old states that are no longer being used.

At step 912 the new MDP may then be solved to find the new ASF.

At step 914 the new ASF is called using the new state to determine the action.

At step 916, the action returned to master AI agent 518 from steps 908 or step 914 is executed. In an embodiment, the action returned by the ASF 510 may be invoked by a function call on the master AI agent 518. For example, the action may be to send an instruction directly to the multimedia gateway 508 to block the incoming call, or the master AI agent 518 function call may require it to invoke one or more generative AI communication agents 516 to perform additional sub-tasks before sending an instruction to multimedia gateway 508.

At step 918, a reward may be generated for the execution of the action. In an embodiment, a reward function may return an immediate reward received after transitioning from one state to another due to an action. Rewards are a measure of fulfillment of user preferences. In an embodiment, rewards may be indicative of a related alignment score. Alignment score may be a quantitative measure of user reward captured vs maximum possible.

ASF 510 may be configured to select an action based on the state of the communications of the registered user in environment state model 522 and the actions with higher reward value may be preferred to optimize long-term rewards. Master AI agent 518 and ASF 510 may use environment state model 522 to simulate and evaluate not only the immediate reward from an individual action but also the accumulated reward of sequences of actions to maximize long-term rewards, noting that the solution of the MDP is the ASF which maximizes the expected reward.

In an embodiment, ASF 510 may be configured to choose actions that maximize the expected value of rewards to the user given the uncertainty of being able to connect and communicate with them, i.e. maximize the probability of connecting multiplied by the reward if connected. In other words, actions may be selected that optimally manage the tradeoff between the dynamic "reachability" of the user to contacts/parties and the reward to the registered user when contact is made. The "reachability" may be the probability of getting to a state of having communicated with a target contact either directly through a single hop or through a more complex path on the interaction graph.

EXAMPLES

When an incoming communication is identified as SPAM, master AI agent 518 may instruct multimedia gateway 508 to block the incoming communication. In an alternate embodiment, master AI agent 518 may instruct multimedia gateway 508 to have the SPAM caller connected to an AI communication agent 516 to answer a SPAM caller. In an embodiment, an AI communication agent 516 may talk to the caller and confirm that the incoming communication is SPAM and then instruct the multimedia gateway 508 to disconnect the call. In another embodiment, an AI communication agent 516 may take the role of "spam-the-spammer timewaster" in which role AI communication agent 516 will first talk with the caller to confirm the call is indeed spam and then deliberately waste the time of the spammer using a convincingly earnest human voice in a pointless, rambling conversation. Contact information of the incoming SPAM communication may be sent to legal authorities and stored in a long-term memory associated with communication management server 506.

When the incoming communication is from a close contact associated with a registered user's device, an AI communication agent 516 may provide a notification on the registered user's device. If the registered user accepts a voice call, processing of the incoming communication may be considered complete and a reward may be provided. In some cases, the incoming communication may be redirected to another resource (e.g. another AI communication agent, such as an AI voicemail agent), or the incoming communication may be rescheduled to another time and only a partial reward may be generated.

In case the user decides not to answer a voice call, the call may get routed to a new AI communication agent which may use a friendly and apologetic persona that communicates that the registered user cannot take the call now and will communicate later. In an embodiment, if the calling device is also registered with communication management server 506, AI communication agents associated with both users can negotiate and coordinate an appropriate time to call based on their objectives and constraints and automatically make the connection when the two users are scheduled to be free.

In another example, a registered user of the system, Bob, is working at his company office in San Francisco, his wife is working at another office across town and his son is in high school not far from Bob's office. Bob has pre-configured his communication management system to assume a persona called "Angel" when communicating with or about his family. The time is 2:35 pm and Bob is in the middle of an important Zoom video conference with a potential business prospect in Dallas. Bob forgot to charge his smartphone overnight and didn't notice the phone battery was low until partway through the video conference and his smartphone has now died completely and is no longer communicating on any network. Bob makes a mental note to get his charger from his car and charge his phone after his video conference is over. Meanwhile, an urgent security situation has arisen at Bob's son's high school. Bob's wife tried to call Bob 3 minutes ago, but her call went to voice mail because Bob's phone was dead. Bob's son tried to send Bob a text message from the school 2 minutes ago. One minute later in the middle of the video conference, Angel proactively and unexpectedly joins Bob's video conference with the business prospect and says, "Excuse me, and sincere apologies for interrupting this video conference, but there is an urgent situation I need to make Bob aware of" Bob talks to the business prospect who understands and leaves the video conference. Bob tells Angel that his phone is dead and it's okay to talk about the personal matter on the video conference now. Angel tells Bob about the situation at his son's high school, that Bob's wife just tried to call him worried that his son, and that his son had texted him and that she (Angel) in the last 2 minutes has already taken the following actions:

- Angel talked to Bob's wife reassuring her that she is trying to locate Bob and that she is trying to join his video conference to let him know.
- Angel replied to the text message from Bob's son (as Angel) saying that she is locating his father, and he loves him
- Angel emailed Bob's manager to say that Bob needs to leave work urgently and requested to reschedule their one-on-one meeting that is currently scheduled for 4 pm today on Bob's calendar
- Angel emailed Bob's dry-cleaning company (as Bob) saying he won't be able to pick it up before 5 pm when they close even though it is overdue (based on a reminder Bob had on his calendar)

Still on the video conference with Angel, Bob tells Angel to let his wife know that he's on his way to the school and will charge his phone from his car and asks Angel to put him on a call with his wife as soon as his phone charges enough to rejoin the network and to also try to get his son on a 3-way conference call with his wife while Bob is busy driving. This example highlights the network aspect of the system in the absence of a smartphone and the ability of the system to think and act as a human would in the interests of the human user and understanding a new situation.

Figure 10:
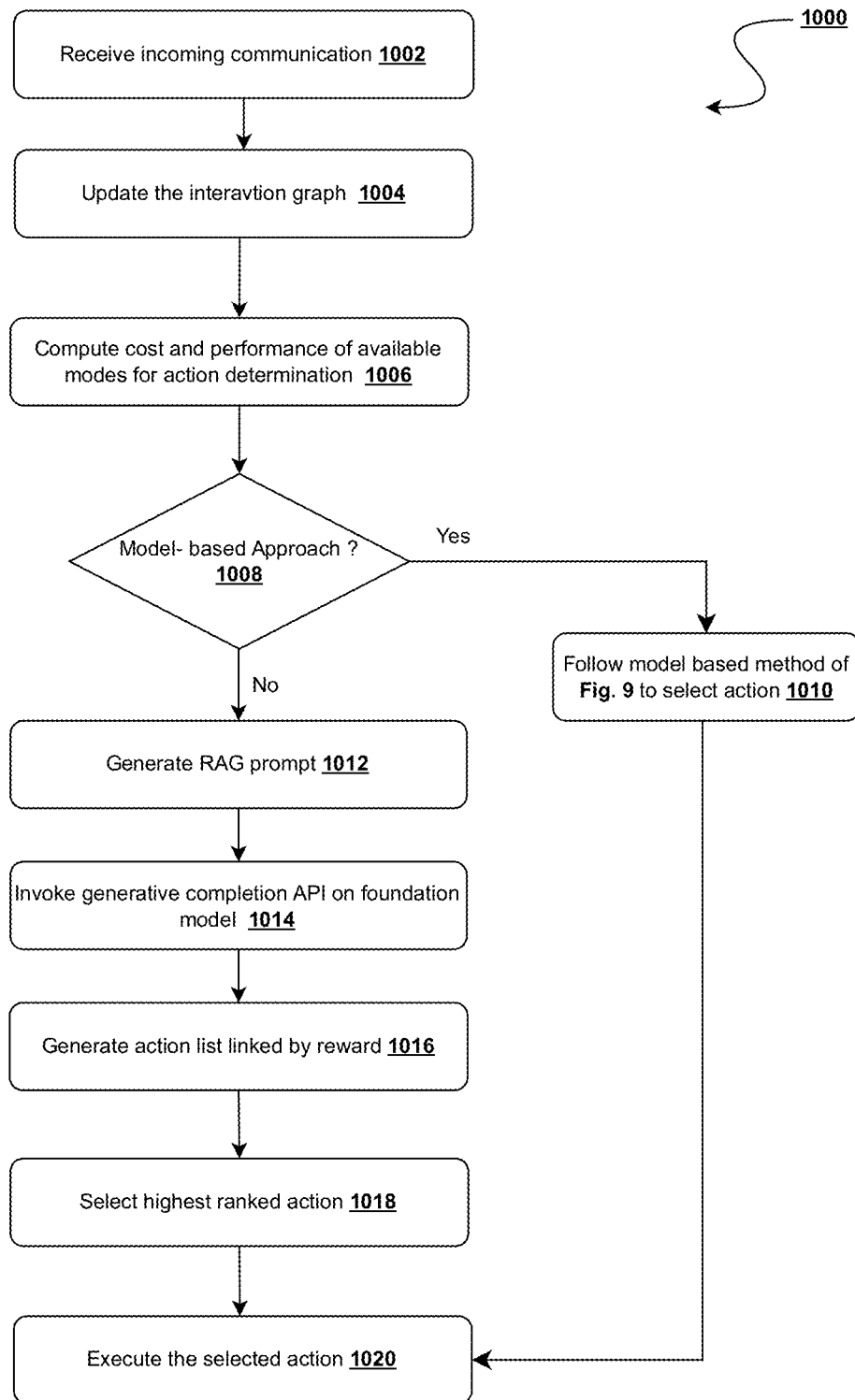
FIG. 10 is a flow diagram of an example method for determining an action for processing an incoming communication using model-free and model-based modes, in accordance with an embodiment of the invention.

FIG. 10 is a flow diagram of an example method for determining an action for processing an incoming communication using model-free and model-based modes, in accordance with an embodiment of the invention.

In model-based reinforcement learning, the decision-making process involves the construction of an internal model of the "world" of the user, also referred to as the "environment." Part of the environment state model 522 covers the communications aspect concerning the state of all communication devices including which devices the user is currently using, who they are communicating with, for how long, on what topic, the number and content of unread messages, and so on. However, a truly "holistic" and "human-centric" view of a user's world that drives their communication behavior needs to also include information not normally considered in telecommunications such as the state of relationships with other people, the current state of mind of the user, current ability to focus, state of tiredness and emotional aspects. Users have long-term goals and also dynamic short-term goals and transient interests, or changes in relationships and responsibilities in their personal and business lives and so on.

Further, modeling a person's world given all possible actions they could perform in that world is a nearly impossible task, however, for now, only the communications actions that can be performed by communication management server 506 are considered. These include simple control actions such as answering, terminating, recording, and redirecting communications, but also more human-like actions such as analyzing the content and tone of a message, inferring the intent, degree of urgency, and so on. Other communication actions include generating content (text, voice, or video) or responding to communications using appropriate emotions and degree of formality. But always doing so using a system and method that ensures that the goals and objectives of the AI in the system are aligned with the goals, objectives, and constraints of the user. Further, accurate modeling of the environment may be complex and computationally expensive.

On the other hand, true "model-free" reinforcement learning may not use an internal model of the user's world environment. Instead, it learns the value of actions directly through trial-and-error interactions with the environment. This approach estimates the rewards associated with different actions and uses these estimates to make decisions. The primary advantage of model-free learning is that it does not require a model of the environment, making it simpler and often more robust to errors in model specification. The downside is that it may require more interactions to learn an effective action selection function ASF 510, especially in complex environments. These model-free systems cannot generally plan, as they do not anticipate future states beyond learning from direct trial-and-error interactions. Their decision process is short-sighted, focusing on immediate outcomes.

Here by "model-free" it means that there is no explicit internal model of the user environment maintained as was done in FIG. 9 where a state representation function was used to represent the state based on both fully observable state and "latent" state from the GCN and state dynamics under uncertainty described by an MDP. Here in the "model-free" mode, the environment state is only represented "externally" within an LLM by prompting an LLM with the important features from the interaction graph, including fully observable current communication state, relationship states, communication history, and user objectives and preferences in a form of retrieval-augmented-generation relying on the limited reasoning, planning, and prioritization skills of the LLM. In an embodiment, the system may also perform true model-free learning by trial-and-error but generally this results in poor quality of actions early in the learning process which is not acceptable to users, so what is needed is a flexible way to leverage the limited modeling provided by the LLM early in the deployment process in parallel to the model-based approach and dynamically choose the best mode based on performance, history, and novelty of situations being encountered.

In FIG. 10 at step 1002, master AI agent 518 may receive signaling and routing information related to the incoming communication device via the multimedia gateway 508. The incoming communication may be directed towards a first-user device registered with the communication management server 506. The incoming communication may be a voice message, an audio call, a text message, an email, or a video communication.

At step 1004, master AI agent 518 updates the interaction graph.

At step 1006, master AI agent 518 may determine the current performance and cost of available model-free and model-based modes for action determination. In one embodiment, master AI agent 518 may perform decision-making using two different modes of reinforcement learning referred to as "model-based" and "model-free". Master AI agent 518 may switch between these two approaches based on the availability of adequate relevant historical data, the observed decision quality, user goal modifications, or changes in the user's environment. The terms "model-based" and "model-free" are as described above.

At step 1008, ASF 510 may determine if a model-based approach is being used for determining the action. To be more flexible and leverage the advantages of both model-based and model-free learning at different times or in different situations, master AI agent 518 may support both model-based and model-free approaches concurrently, and the system is equipped to automatically adapt to use the best approach.

The relative performance and costs of the model-free and model-based methods for computing the ASF 510 may be evaluated, and one of the following choices may be made; (i) to use only the best-performing mode (ii) to switch to a different mode or (iii) to return an ensembled suggestion (mixture of experts). The method selected may change based on user situation, user settings, available data, and devices of the users. Furthermore, the registered user may begin setting goals that require more complex planning in which case the model-based approach would be required.

At step 1010, when the model-based method is used by master AI agent 518, the model-based approach of FIG. 9 is performed to determine the action to be used and the action selected using environment state model 522 may be received for execution by master AI agent 518.

At step 1012, a Retrieval Augmented Generation (RAG) style system prompt and user prompt is generated for a generative AI LLM and populated with the important features from the interaction graph, including fully observable current communication state, relationship states, communication history, and user objectives and preferences in a form of retrieval-augmented-generation relying on the limited reasoning, planning, and prioritization skills of the LLM to generate a ranked list of suggested actions.

At step 1014, to determine action for incoming communication, a generative completion API may be invoked on a foundation model using the prompts generated in step 1012. In an embodiment, the foundation model may be a pre-trained public foundation model. In another embodiment, the foundation model may be a pre-trained custom foundation model. Generative AI may be a custom model that has been pre-trained to select communication actions to maximize a user reward. The training follows the typical approach of a Chat LLM starting with tasking human labelers to suggest action sequences based on samples presented of holistic states and user objectives, which may be then used to fine-tune a Generative Pretrained Transformer model which then creates candidate actions that are then ranked by human labelers which constitutes a reward model that may be used in a proximal policy optimization loop to train the generative AI for finally generating a ranked sequence of communication actions given user goals and a holistic state description. However, building such a generative model from scratch may be expensive and may lack a large amount of real-world human thinking about life, work, balancing priorities, and general communications. Therefore, a more cost-effective approach for the model may be to simply fine-tune a pre-trained public LLM. In another embodiment, the model-based approach described in FIG. 9 is used to fine-tune the model.

At step 1016, the foundation model may generate an action list ranked by reward and a highest-ranked action may be selected at step 1018. At step 1020, the action is executed.

The skilled person will be aware of a range of possible modifications of the various embodiments described above. Accordingly, the present invention is defined by the claims and their equivalents.

What is claimed is:

1. A system for managing incoming communications, the system comprising:
 a multimedia gateway configured to manage real-time media across multiple communication channels; and
 a communication management server comprising one or more processors, a memory, and a plurality of programming instructions stored in the memory, the plurality of programming instructions when executed by the one or more processors causes the one or more processors to:
 maintain an interaction graph in the memory, wherein the interaction graph is a heterogeneous multigraph holding multiple graph representations for modeling relationships and communication patterns between users and devices;
 receive, by a master AI agent running on the communication management server, a notification of an incoming communication associated with a user device among a plurality of user devices, wherein the incoming communication is one of a voice message, an audio call, a text message, an email or a video communication;
 update the interaction graph based on the incoming communication;
 determine, using a state representation function, a current state for a user environment based on a context associated with the incoming communication, user preferences associated with the user device and the interaction graph;

compare, using a graph neural network, the current state of the user environment with different states in an environment state model, wherein the environment state model implements a Markov Decision Process (MDP) to reflect the different states, actions, and associated rewards;

responsive to non-identification of a match between the current state and the different states in the environment state model, update the environment state model to reflect the current state by;

normalizing numerical values and numerically encoding categorical variables from the current state, converting text data into dense vector embeddings, clustering the dense vector embeddings to define new states, and validating the new states using a large language model;

solve the MDP using dynamic programming to determine a new action selection function (ASF);

invoke, the new ASF to determine an action associated with the user environment for processing the incoming communication, wherein the action is executed by the master AI agent using at least one of the multimedia gateway and/or an AI communication agent among a plurality AI communication agents associated with the communication management server; and execute the action by configuring at least one of: the multimedia gateway to redirect or block the incoming communication, or an AI communication agent among a plurality of AI communication agents associated with the communication management server to engage in a dialog related to the incoming communication.

2. The system of claim 1, wherein the plurality of programming instructions when executed by the one or more processors causes the one or more processors to:

responsive to identifying the match between the current state and an existing state in the different states, invoke an existing ASF to determine the action associated with the user environment for processing the incoming communication.

3. The system of claim 1, wherein the plurality of programming instructions when executed by the one or more processor causes the one or more processors to:

store the action executed by the master AI agent at a repository for enabling centralized learning, wherein the master AI agent can access content from the repository.

4. The system of claim 1, wherein the plurality of programming instructions when executed by the one or more processors causes the one or more processors to:

responsive to identifying that the incoming communication is call from a spammer, select AI communication agent among the plurality of AI communication agents to communicate with the spammer;

responsive to completion of the incoming communication with the spammer, instruct the multimedia gateway to block the incoming communication received from device associated with the incoming communication; and store the device associated with the incoming communication in blacklist data.

5. The system of claim 1, wherein the context associated with the incoming communication comprises timing of the incoming communication, historical frequency of the incoming communication, relationship between the user device and the plurality of user devices and the user preferences associated with respective user devices.

6. The system of claim 1, wherein to execute the action, the plurality of programming instructions when executed by the one or more processors causes the one or more processors to: transmit instructions to the multimedia gateway to redirect an incoming call to another resource or another time.

7. The system of claim 1, wherein to execute the action, the plurality of programming instructions when executed by the one or more processors cause the one or more processors to:

select AI communication agent among a plurality of agents to initiate a dialog through the multimedia gateway with a device associated with the incoming communication to gather additional data and/or reply to the incoming communication.

8. The system of claim 1, wherein the communication management server maintains the user preferences of registered user devices, wherein the user preferences comprise at least one of: global objective and goals, do not disturb (DND) hours, contact exceptions, communication type priority, integrated permissions information, and customized rules to identify senders based on keywords.

9. The system of claim 1, wherein the plurality of programming instructions when executed by the one or more processors causes the one or more processors to:

responsive to execution of the action, generate a reward, wherein the reward is indicative of fulfillment of the user preferences.

10. A method for managing incoming communications, the method comprising:

receiving, by a master AI agent running on a communication management server, a notification of an incoming communication associated with a user device among a plurality of user devices, wherein the incoming communication is one of a voice message, an audio call, a text message, an email, or a video communication, wherein the master AI agent receives communication via a multimedia gateway configured to manage real-time media across multiple communication channels;

storing an interaction graph in a memory, wherein the interaction graph is a heterogeneous multigraph holding multiple graph representations for modeling relationships and communication patterns between users and devices;

determining, using a state representation function, a current state for a user environment based on a context associated with the incoming communication, user preferences associated with the user device, and the updated interaction graph;

comparing, using a graph neural network, the current state of the user environment with different states in an environment state model, wherein the environment state model implements a Markov Decision Process (MDP) to reflect the different states, actions, and associated rewards;

responsive to non-identification of a match between the current state and the different states in the environment state model, updating the environment state model to reflect the current state by normalizing numerical values and numerically encoding categorical variables from the current state, converting text data into dense vector embeddings, clustering the dense vector embeddings to define new states;

solving the MDP using dynamic programming to determine a new action selection function (ASF);

invoking, the new ASF to determine an action associated with the user environment for processing the incoming communication, wherein the action is executed by the master AI agent using at least one of the multimedia gateway and/or an AI communication agent among a plurality AI communication agents associated with the communication management server; and executing the action by configuring at least one of: the multimedia gateway to redirect or block the incoming communication, or an AI communication agent among a plurality of AI communication agents associated with the communication management server to engage in a dialog related to the incoming communication.

11. The method of claim 10, wherein the method comprises:

responsive to identifying a match between the current state and an existing state in the different states, invoking an existing ASF to determine the action associated with the user environment for processing the incoming communication.

12. The method of claim 10, wherein the method comprises storing the action executed by the master AI agent at a repository for enabling centralized learning, wherein the master AT agent can access content from the repository.

13. The method of claim 10, wherein the method comprises:

responsive to identifying that the incoming communication is a call from a spammer, selecting an AT communication agent among the plurality of AT communication agents to communicate with the spammer;

instructing the multimedia gateway to block the incoming communication received from device associated with the incoming communication; and storing the device associated with the incoming communication in blacklist data.

14. The method of claim 10, wherein the context associated with the incoming communication comprises timing of the incoming communication, historical frequency of the incoming communication, relationship between the user device and the plurality of user devices, and the user preferences associated with respective user devices.

15. The method of claim 10, wherein executing the action further comprises:

transmitting instructions to the multimedia gateway to redirect an incoming call to another resource or another time.

16. The method of claim 10, wherein executing the action further comprises selecting an AI communication agent among a plurality of agents to initiate a dialog through the multimedia gateway with a device associated with the incoming communication to gather additional data and/or reply to the incoming communication.

17. The method of claim 10, wherein the communication management server maintains the user preferences of registered user devices, wherein the user preferences comprise at least one of: global objective and goals, do not disturb (DND) hours, contact exceptions, communication type priority, integrated permissions information, and customized rules to identify senders based on keywords.

18. The method of claim 10, wherein the method further comprises:

responsive to execution of the action, generating a reward, wherein the reward is indicative of fulfillment of the user preferences.

\* \* \* \* \*